United States Patent [19]
Utsunomiya et al.

[11] Patent Number: 5,737,092
[45] Date of Patent: Apr. 7, 1998

[54] IMAGE PROCESSING APPARATUS FOR PRINTING DATA RECEIVED FROM A PLURALITY OF DATA OUTPUT DEVICE

[75] Inventors: Takehito Utsunomiya, Yokohama; Kunio Yoshihara, Sagamihara; Yoshinobu Aiba; Hideto Kohtani, both of Yokohama, all of Japan

[73] Assignee: Canon Kabushiki Kaisha, Japan

[21] Appl. No.: 814,006

[22] Filed: Mar. 10, 1997

Related U.S. Application Data

[63] Continuation of Ser. No. 372,871, Jan. 13, 1995, which is a continuation of Ser. No. 970,829, Nov. 3, 1992, abandoned.

[30] Foreign Application Priority Data

Nov. 7, 1991 [JP] Japan .................................. 3-291450

[51] Int. Cl.$^6$ ............................ H04N 1/00; H04N 1/40; H04N 1/32
[52] U.S. Cl. ...................... 358/407; 358/400; 358/448; 358/468
[58] Field of Search ........................ 358/296, 400, 358/401, 403, 407, 408, 448, 468; 395/105, 112, 114

[56] References Cited

U.S. PATENT DOCUMENTS

| | | | |
|---|---|---|---|
| 4,791,492 | 12/1988 | Nagashima et al. | |
| 4,887,164 | 12/1989 | Takahashi | 379/100 |
| 4,947,266 | 8/1990 | Watanabe et al. | 358/400 |
| 4,947,345 | 8/1990 | Paradise et al. | 379/100 |
| 5,197,117 | 3/1993 | Kato et al. | |
| 5,224,157 | 6/1993 | Yamada et al. | 379/100 |

FOREIGN PATENT DOCUMENTS

| | | |
|---|---|---|
| 0410668 | 1/1991 | European Pat. Off. |
| WO9012359 | 10/1990 | WIPO |

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

An image processing apparatus comprises an input unit to supply code data from a plurality of data output devices, a converter to convert the code data supplied by the input unit into the image data every dot, and a generating unit to generate the image data obtained by the converter to a recording device. When print requests from a plurality of data output devices are simultaneously received, the image based on the data from each of the data output devices is switched every predetermined unit and generated.

16 Claims, 8 Drawing Sheets

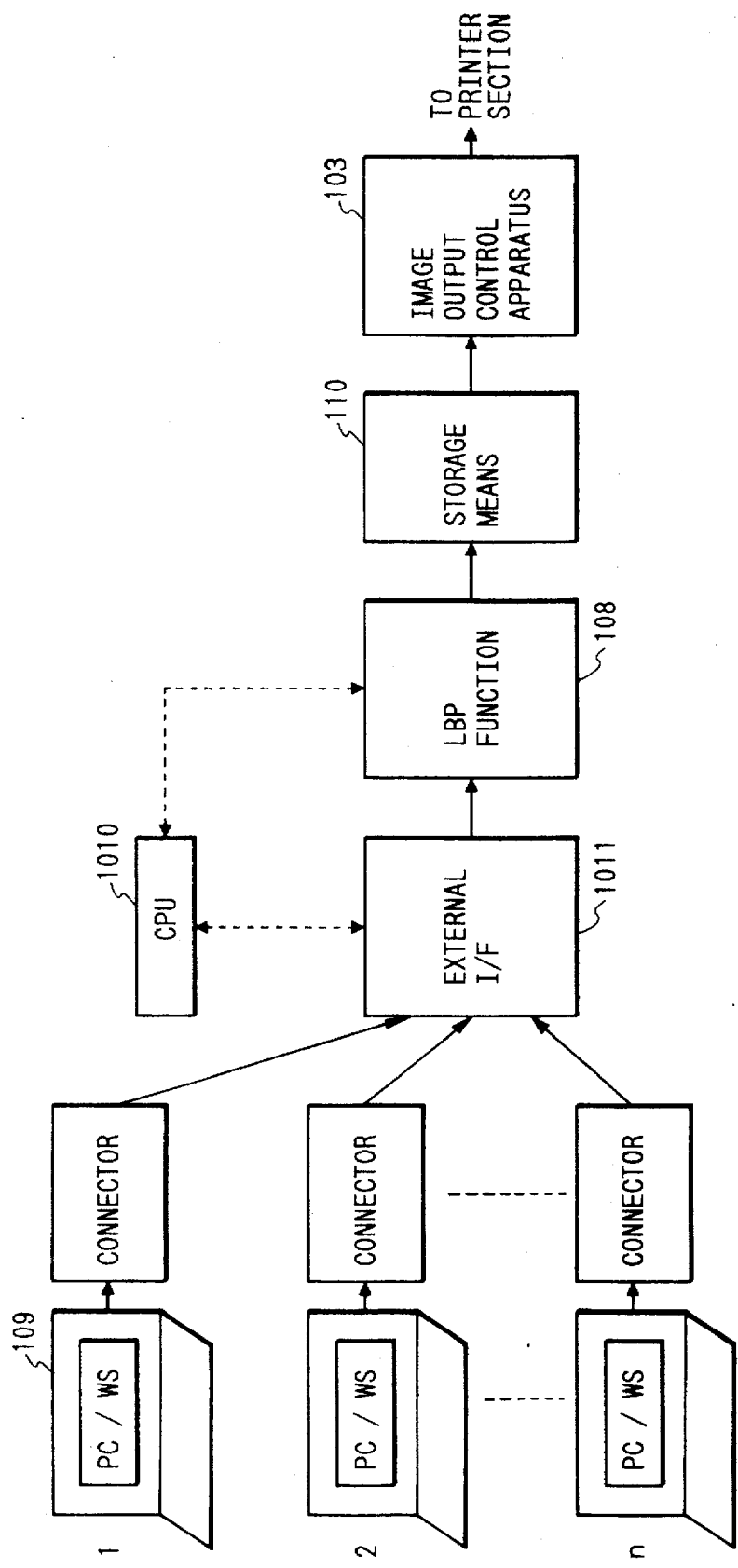

IMAGE PROCESSING APPARATUS FOR PRINTING DATA RECEIVED FROM A PLURALITY OF DATA OUTPUT DEVICE

This application is a continuation of application Ser. No. 08/372,871 filed on Jan. 13, 1995, which is a continuation of application Ser. No. 07/970,829 filed on Nov. 3, 1992, now abandoned.

BACKGROUND OF THE INVENTION

1. Field of the Invention

The invention relates to an image processing apparatus which is preferably embodied in an image forming apparatus or the like to which a plurality of data output apparatuses such as computers or the like can be connected.

2. Related Background Art

Hitherto, in a construction in which a plurality of computers are connected to one image forming apparatus, in the case where image forming commands are generated from the plurality of computers, the computer which generated the image forming command for the first time preferentially executes the image formation and after completion of all of the image forming operations of such a computer, the image forming operation of the computer which secondly generated the image formation request is performed.

As mentioned above, when the image formation requests are supplied from a plurality of computers to the image forming apparatus, one computer monopolizes the image forming apparatus. Therefore, for instance, there is a problem such that just after the image formation request was generated to print a large amount of data, in the case where the image formation request is generated from another computer in order to print one paper, the computer which generated the image formation request later can start the print only after waiting for the completion of the print of such a large amount of data by the first image information request even if the number of papers to be printed by such a second computer is equal to one.

SUMMARY OF THE INVENTION

It is an object of the invention to solve the above problem.

Another object of the invention is to improve an image processing apparatus which can be connected to a plurality of data generating sources.

Still another object of the invention is to provide an image forming apparatus which can prevent that the waiting time vainly becomes long.

According to the invention, by providing a control mechanism of a microcomputer or the like to each function unit and by transmitting and receiving control signals between such a control mechanism and a control mechanism for controlling an image input/output unit, even in the case where image formation requests are generated from a plurality of computers, image storage means is used and the waiting times which are required until the print-out in response to the image formation requests by a plurality of computers can be uniformed.

The above and other objects and features of the present invention will become apparent from the following detailed description and the appended claims with reference to the accompanying drawings.

BRIEF DESCRIPTION OF THE DRAWINGS

FIG. 8 is a block diagram showing a characteristic construction in the third embodiment.

DETAILED DESCRIPTION OF THE PREFERRED EMBODIMENTS

Embodiments of the invention will be described hereinbelow with reference to the drawings.

(Embodiment 1)

Figure 1:
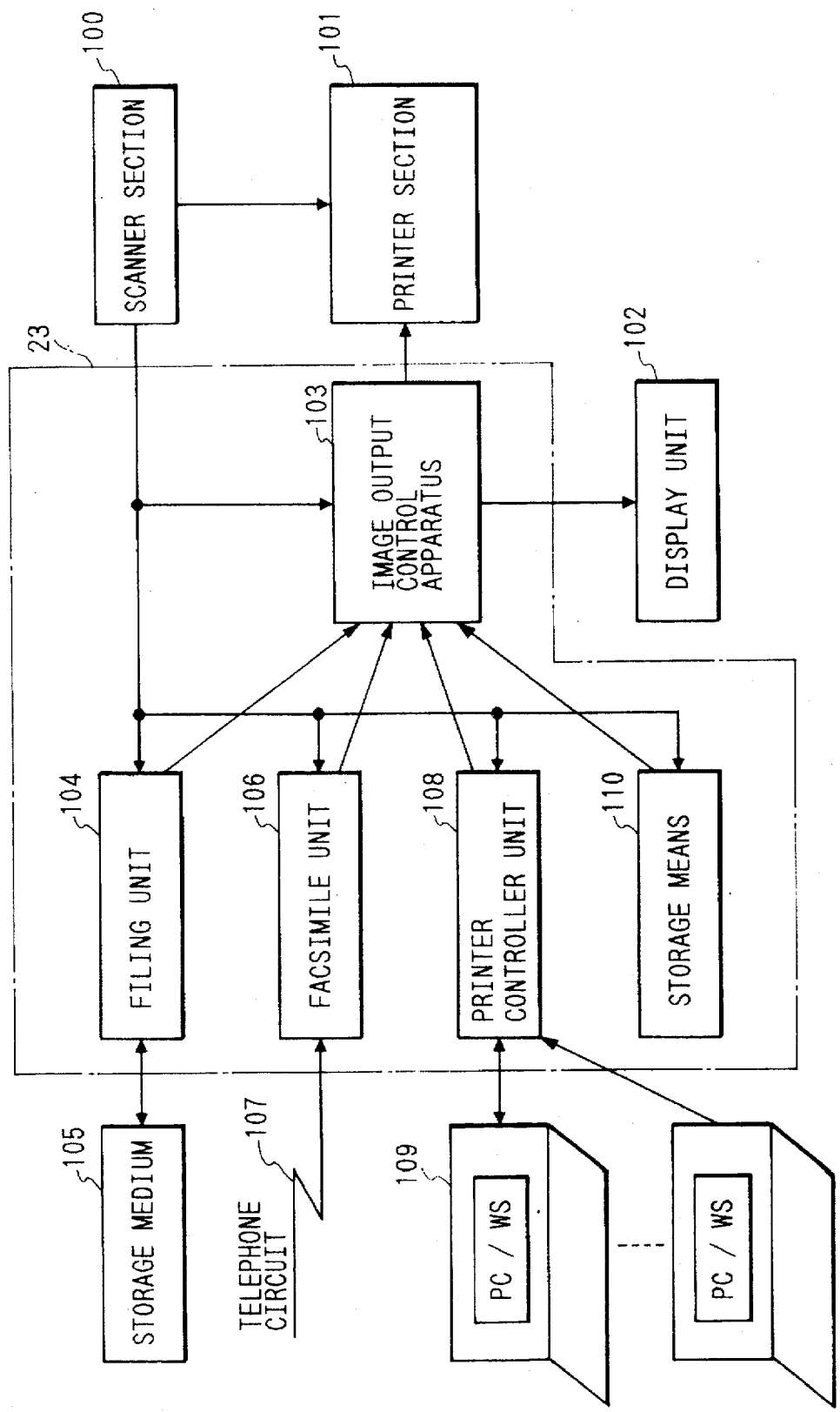
FIG. 1 is a block diagram of a construction of the first embodiment of the invention.

In FIG. 1, reference numeral 100 denotes a scanner section as an image input apparatus for converting an original image into image data; 101 a printer section which has cassettes of a plurality of kinds of recording papers and is used to print out the image data onto a paper by a print-out command in each function (hereinafter, a construction including the scanner section 100 and the printer section 101 is called an image forming apparatus (copying machine) 1000); 102 a display unit to electrically display the image data; and 103 an image output control apparatus for switching an image output signal from each function to the printer section 101 or display unit 102.

Reference numeral 104 denotes a filing unit for recording the image data read by the scanner section 100 onto a storage medium 105 and for sending the image data stored in the storage medium 105 to the image output control apparatus 103.

Reference numeral 106 denotes a facsimile unit for compressing the image data obtained from the scanner section 100 to the data based on the standard (MH, MR, MMR) of the facsimile and transmitting the compressed data by using a telephone circuit 107 and for expanding the facsimile data transmitted through the telephone circuit 107 and converting into the image data.

Reference numeral 108 denotes a printer controller unit for converting a printer control command such as a page description language or the like sent from a computer 109 or the like into image data.

Reference numeral 110 denotes storage means having functions such that the image data derived from the scanner section 100, filing unit 104, facsimile unit 106, and printer controller unit 108 can be stored and the image data can be generated to the image output control apparatus 103. The filing unit 104, facsimile unit 106, printer controller unit 108, storage means 110, and the like are enclosed in a casing of an external apparatus 23 (FIG. 2) or the like.

Figure 2:
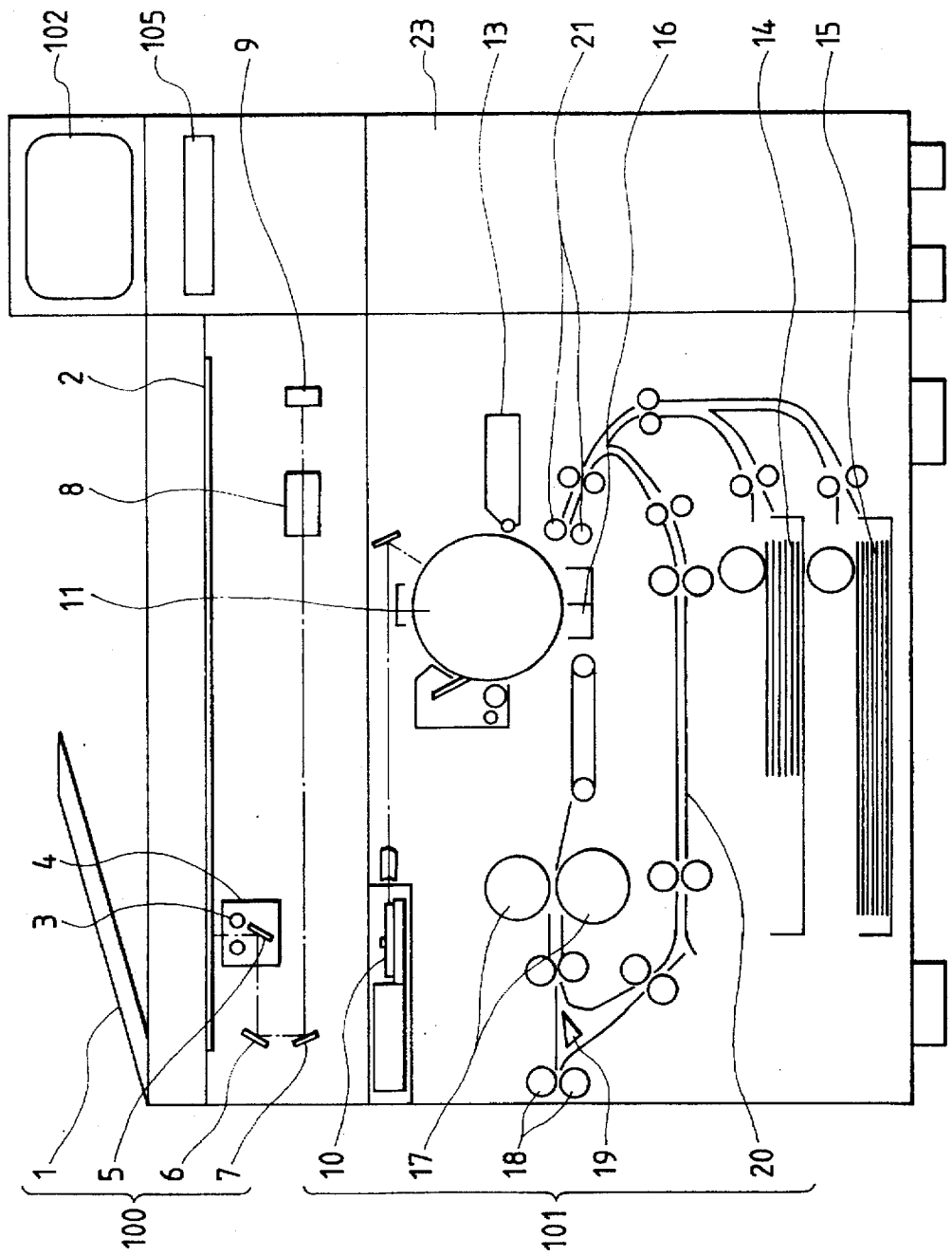
FIG. 2 is a diagram of a whole image forming apparatus of the first embodiment.

In FIG. 2, the fundamental operations of the scanner section 100 and printer section 101 serving as an image input/output unit will now be described. Originals put on a document feeder 1 are sequentially conveyed one by one onto a glass surface of an original supporting plate 2. When the original is conveyed, a lamp of a scanner portion 3 is lit on and a scanner unit 4 is moved and illuminates the original. The reflected light from the original is reflected by mirrors 5, 6, and 7 and passes through a lens 8. After that, the light enters an image sensor unit 9.

The image signal supplied to the image sensor unit 9 is processed by the image output control apparatus 103 (FIG.

1) including a CPU or the like. The processed signal is sent to the printer section 101. The signal supplied to the printer section 101 is converted into the photo signal by an exposure control unit 10 and a photo sensitive material 11 is illuminated in accordance with the image signal. A latent image formed on the photo sensitive material 11 by the illumination light is developed by a development unit 13. A copy transfer paper is picked up and conveyed from a transfer paper stacking unit 14 or 15 in accordance with the timing of the latent image. The paper is positioned to a copy transfer unit 16 by registration rollers 21. After that, the developed image is copy transferred. The transferred image is fixed onto a copy paper by a fixing unit 17. After that, the copy paper is discharged to the outside of the apparatus by a discharging unit 18. Reference numeral 20 denotes an intermediate tray which is used in the both-sided printing mode and 19 indicates a change-over flapper to switch a mode to discharge the copy paper and a mode to convey the copy paper to the intermediate tray 20.

Figure 3:
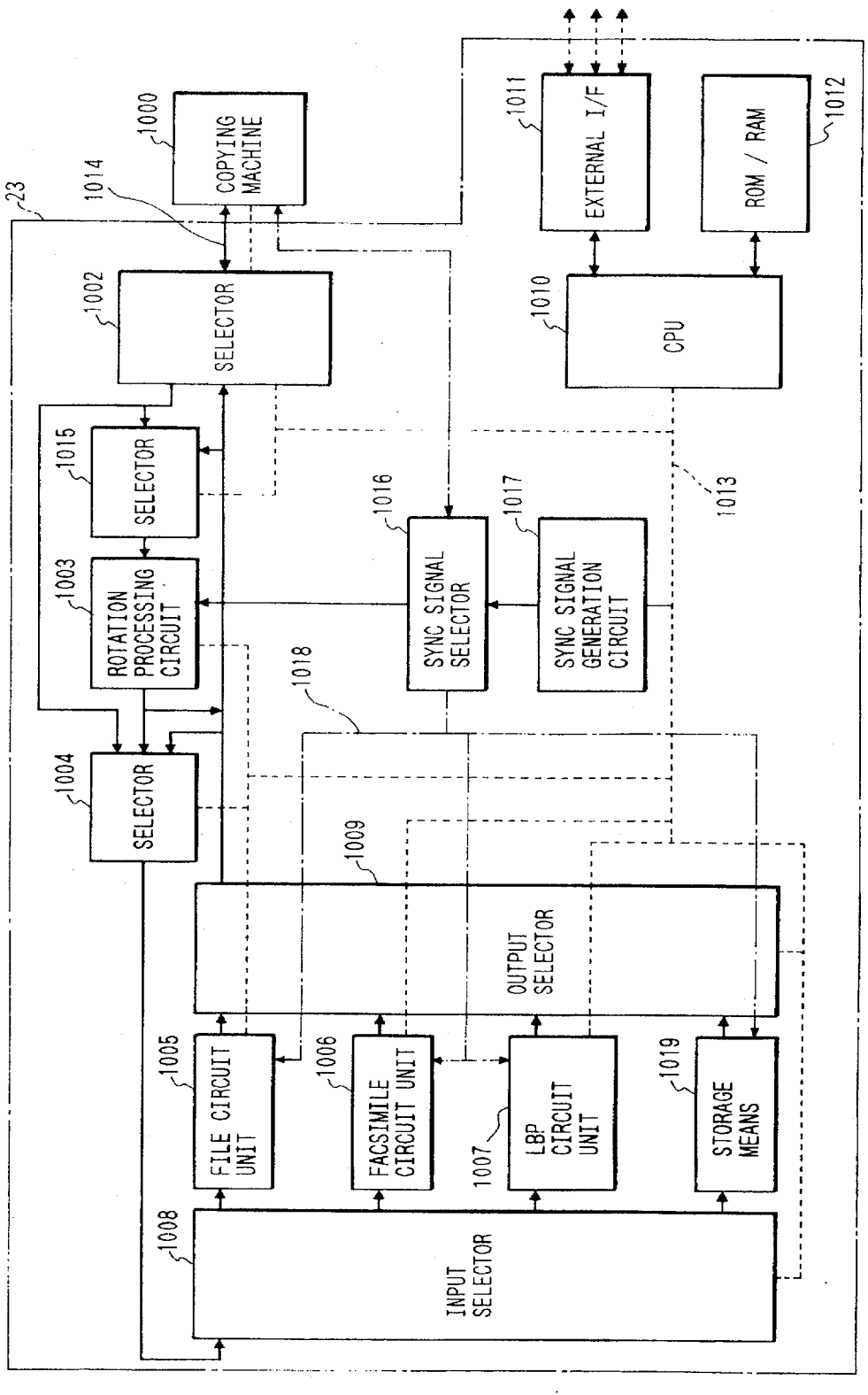
FIG. 3 is a block diagram of each function unit and an image input/output mechanism unit in the first embodiment.

FIG. 3 is a block diagram showing an example of a construction of the external apparatus 23. In FIG. 3, a file circuit unit 1005, a facsimile circuit unit 1006, an LBP circuit unit 1007, and storage means 1019 in FIG. 3 correspond to the filing unit 104, facsimile unit 106, printer controller unit 108, and storage means 110 in FIG. 1, respectively.

The operation in case of filing an original will be first explained with reference to FIG. 3. In this case, a desired original is put on the original supporting plate and various setting operations about the filing are executed. After that, by depressing a copy start key, the various set data is sent from the image forming apparatus (copying machine) 1000 to a CPU 1010 through a selector 1002 by a communication line 1013. The set data is likewise sent from the CPU 1010 to the file circuit unit 1005 by the communication line 1013. On the basis of the set data, the file circuit unit 1005 performs the setting operations according to those data and transmits a signal indicative of the completion of the preparation to the CPU 1010. When the CPU 1010 receives such a signal, the CPU controls the selector 1002 so as to allow the image data to flow in the direction from the image forming apparatus 1000 to a rotation processing circuit 1003. Further, the CPU 1010 controls a selector 1004 and an input selector 1008 so that the image data flows from the rotation processing circuit 1003 to the file circuit unit 1005 via the selector 1004 and the input selector 1008. In this manner, a series of routes of the image data are determined. The CPU 1010 subsequently transmits a signal indicative of the completion of the image fetching preparation to the image forming apparatus 1000. When the image forming apparatus 1000 receives such a signal, the apparatus 1000 starts the fundamental operation of the image forming apparatus such that the lamp of the scanner portion 3 (FIG. 2) is lit on and the scanner unit 4 (FIG. 2) is moved and illuminates the original. An input signal from the scanner section 100 is processed by a CPU of the image forming apparatus 1000. The processed signal passes through an image data line 1014 and is supplied to the selector 1002. The signal is supplied to the file circuit unit 1005 by the flow of the image data as mentioned above. In this instance, when it is necessary to rotate the whole image data, the image data is subjected to the rotating process by the rotation processing circuit 1003. When there is no need to rotate the image data, the image signal is not processed by the rotation processing circuit 1003 and is generated as it is. The file circuit unit 1005 converts the image data into the data of a structure according to the format of a disc and records. After completion of the reading operation, a signal indicative of the end of the reading operation is transmitted from the file circuit unit 1005 to the CPU 1010. When the CPU 1010 receives such a reading end signal, the CPU controls the selector 1002 so as to disconnect the image forming apparatus 1000 from the image data line. The CPU 1010 subsequently transmits a signal indicative of the end of the reading operation to the image forming apparatus 1000, so that the image forming apparatus is returned to the inherent state.

Even in case of facsimile transmitting on original, the operations are substantially the same as those in the above filing case except that the image data is merely supplied to the facsimile circuit unit 1006 in place of the file circuit unit 1005.

The case of printing the filed original will now be described. By depressing the copy start key after various data for printing was set, the various set data is sent from the image forming apparatus 1000 to the CPU 1010 through the selector 1002 by the communication line 1013. The set data is likewise sent from the CPU 1010 to the file circuit unit 1005 by the communication line 1013. On the basis of the set data, the file circuit unit 1005 perform the setting operations according to them and transmits a signal indicative of the completion of the preparation to the CPU 1010. When the CPU 1010 receives such a signal, the CPU controls an output selector 1009 so as to allow the image data to flow in the direction from the file circuit unit 1005 to the rotation processing circuit 1003. Further, the CPU shuts off the selector 1004 and controls the selector 1002 so as to allow the image data to flow from the rotation processing circuit 1003 to the image forming apparatus 1000 through the selector 1002. In this way, a series of routes of the image data are determined as mentioned above. Subsequently, the CPU 1010 transmits a signal indicative of the completion of the preparation of the image output to the image forming apparatus 1000. When the image forming apparatus 1000 receives such a signal, the apparatus 1000 starts the printing operation. The image data is supplied to the image output control apparatus 103 in FIG. 1. The signal supplied to the printer section 101 is printed by the foregoing operation. In this instance, when it is necessary to rotate the whole image data, the image data is rotated by the rotation processing circuit 1003. When there is no need to rotate the image data, the image signal is generated as it is without being processed in the rotation processing circuit 1003. After completion of the print, a signal indicative of the end of the print is transmitted from the image forming apparatus 1000 to the CPU 1010. When the CPU 1010 receives the print end signal, the CPU controls the selector 1002 so as to disconnect the image forming apparatus 1000 from the image data line. Subsequently, the CPU 1010 transmits the print end signal to the file circuit unit 1005, so that the file circuit unit 1005 is returned to the inherent state.

Further, the operation when the data which is transmitted from the computer is generated will now be described. When the foregoing printer control command is transmitted from the computer, it is sent to the LBP circuit unit 1007 through an external interface 1011 and the CPU 1010. When the LBP circuit unit 1007 receives the printer control command, the LBP circuit unit develops the image data into a memory (not shown) in the LBP circuit unit 1007 or into the storage means 1019 in accordance with the printer control command system. After completion of the development, a CPU (not shown) in the LBP circuit unit generates an image data output request to the CPU 1010. A flow of the subsequent processes is similar to that in case of printing out the filed original. Even in case of printing the image data which has been facsimile transmitted, the image data is merely generated to the facsimile circuit unit 1006 in place of the file circuit unit 1005 and the other operations are substantially the same as those in case of generating the image data from the file circuit unit 1005.

The case of facsimile transmitting the filed original will now be described. After the setting operations for various files and facsimile were performed, by depressing the copy start key, the above various set data is sent from the image forming apparatus 1000 to the CPU 1010 through the selector 1002 by the communication line 1013. The set data is similarly sent from the CPU 1010 to the file circuit unit 1005 and the facsimile circuit unit 1006 by the communication line 1013. On the basis of the set data, the file circuit unit 1005 and the facsimile circuit unit 1006 perform the setting operations according to the set data and transmit the preparation completion signals to the CPU 1010. When the CPU 1010 receives such signals, the CPU controls the output selector 1009 so as to allow the image data to flow in the direction from the file circuit unit 1005 to the rotation processing circuit 1003. Further, the CPU 1010 controls the selector 1004 and the input selector 1008 so as to allow the image data to flow from the rotation processing circuit 1003 to the facsimile circuit unit 1006 through the selector 1004. The series of routes of the image data are determined in this manner. The CPU 1010 transmits the image output preparation completion signal to the file circuit unit 1005. When the CPU 1010 receives such a signal, the CPU starts the image data transmitting operation. In this instance, when it is necessary to rotate the whole image data, the image data is rotated by the rotation processing circuit 1003. When there is no need to rotate the image data, the image data is generated as it is without being processed in the rotation processing circuit 1003. After completion of the transmission, a transmission end signal is transmitted from the file circuit unit 1005 to the CPU 1010. When the CPU 1010 receives such a transmission end signal, the CPU controls the output selector 1009 so as to disconnect the image forming apparatus from the image data line. Subsequently, the CPU 1010 transmits a transmission end signal to the facsimile circuit unit 1006, so that the facsimile circuit unit 1006 is returned to the inherent state. Even in the case where the image data which has been facsimile transmitted is filed, where the data sent from a computer is filed, or where the data transmitted from a computer is facsimile transmitted, operations similar to those in the foregoing are executed except that a flow of the image data is merely changed.

Figure 4:
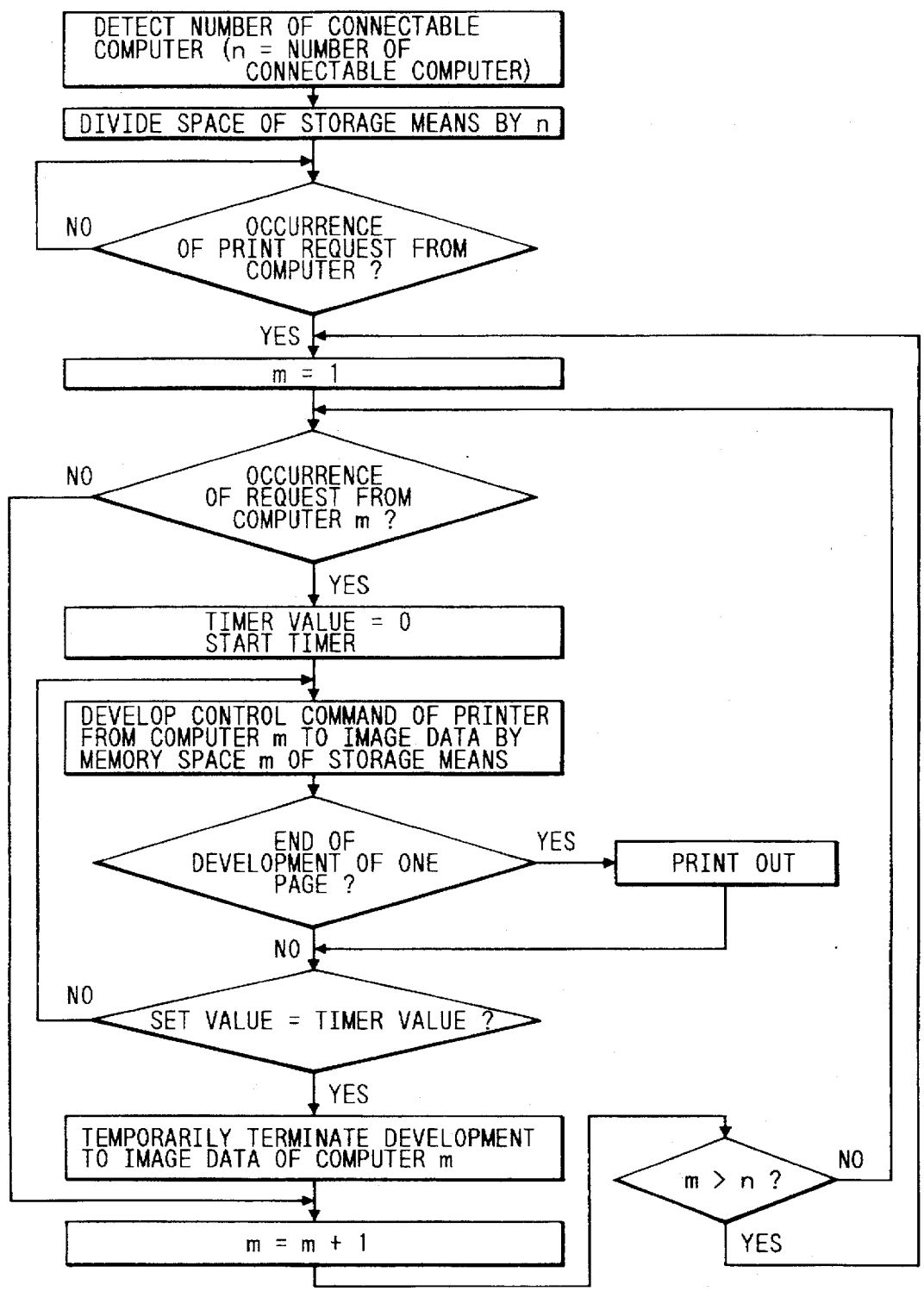
FIG. 4 is an operation flowchart of the first embodiment.
Figure 5:
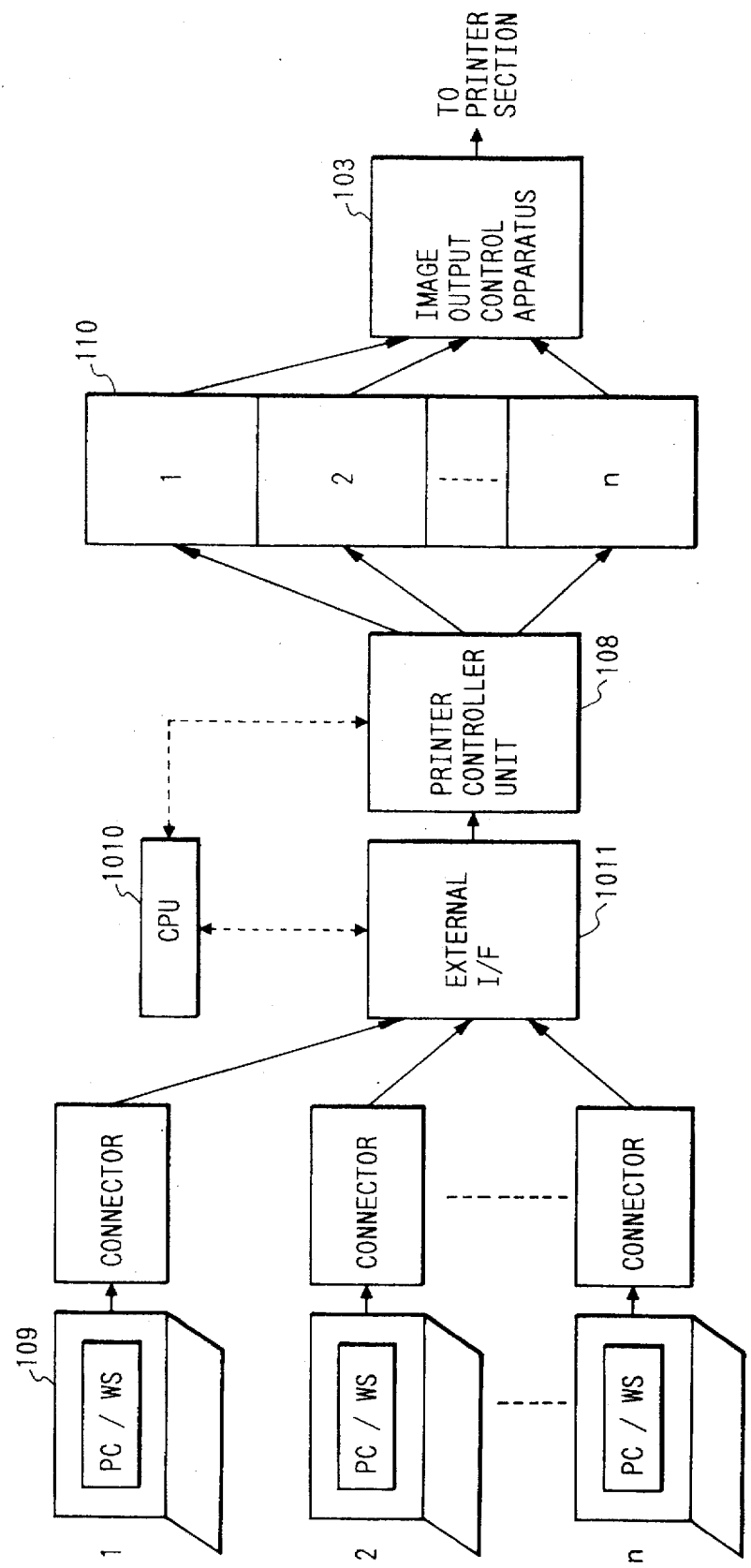
FIG. 5 is a block diagram showing a characteristic construction in the first and second embodiments.

The characteristic operations in the embodiment will now be described. FIG. 4 shows a flowchart showing a whole processing procedure in the case where a plurality of computers are connected to the apparatus of the invention and while one of the computers is printing out, a print request is generated from another computer. FIG. 5 shows a block diagram in such a case.

First, in FIG. 5, the CPU 1010 detects the number n of computers 109 which can be connected to the external I/F 1011 (n=the number of connectable computers). The inside of the storage means 110 of a large capacity is divided (into n) by only the number of computers 109 every memory space unit in which at least one image can be developed. When a print-out request is generated from one of a plurality of computers 109 connected, from which computer the print-out request was generated are detected. With respect to the computer m (m=1, 2, ..., n) which generated the print-out request, the development of the printer control commands into the image data is started in the divided memory space m (m=1, 2, ..., n) in the storage means 110. After completion of the development of every page, the image data is sent from the memory spaces to the image output control apparatus 103 and is printed out by an image output apparatus. When a timer value reaches a certain set value during the development of the image, the development to the image data of the computer m is temporarily stopped, the timer is reset to 0 and started, and the development into the image data of the next computer (m+1) is started.

By time-sharingly (at intervals of the set value of the timer) processing the print requests from a plurality of computers as mentioned above, while a certain one computer is printing out a large amount of data, even if another computer generates the print-out requests, such another computer can print out without waiting for completion of the whole printing-out operation of the computer which is at present printing out. Further, by controlling the sorter attached to the paper discharging unit of the printer unit, each computer is allocated to each discharge tray, so that it is possible to know that the output original relates to the output result from which one of the computers.

(Embodiment 2)

Figure 6:
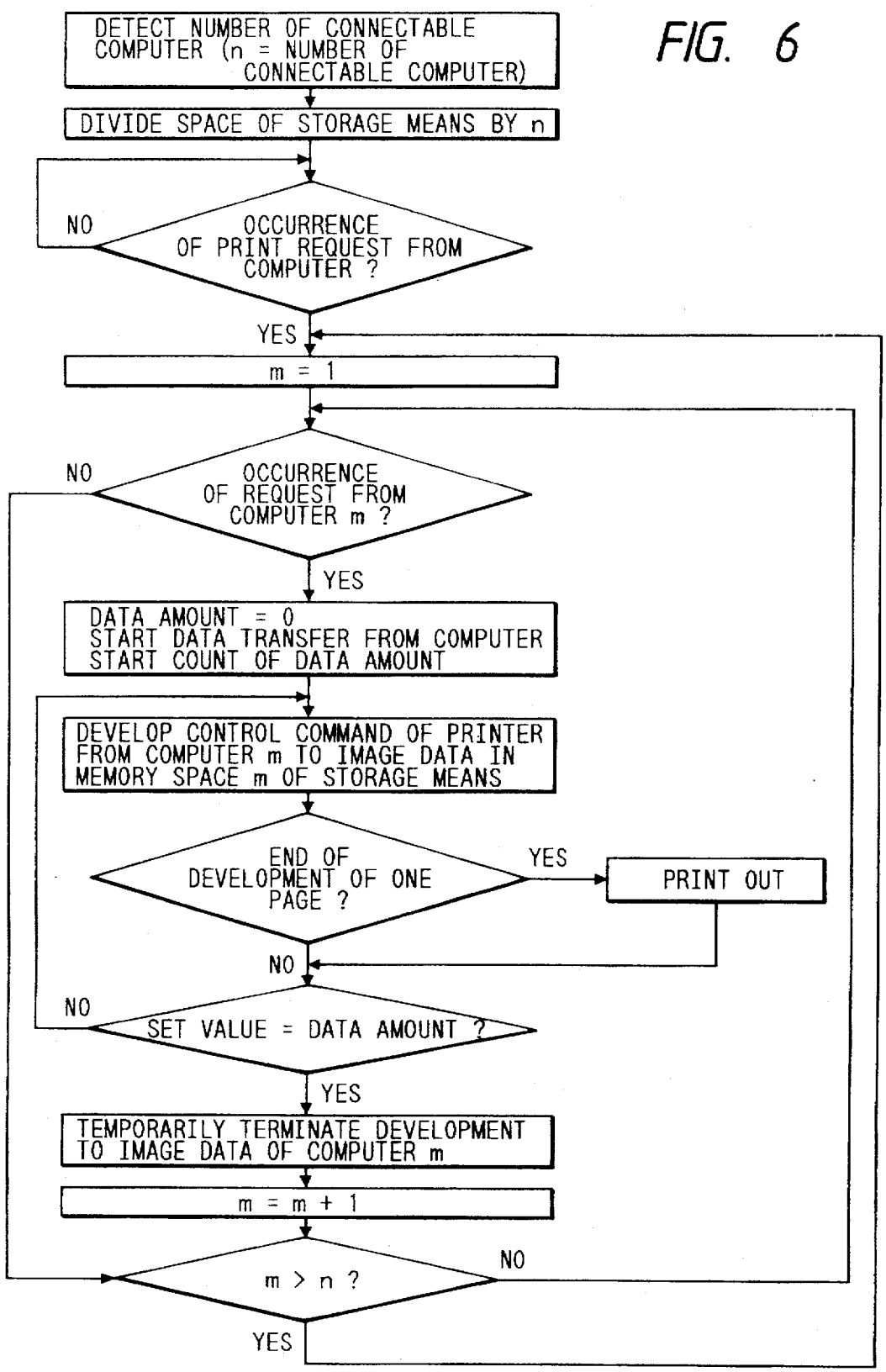
FIG. 6 is an operation flowchart of the second embodiment.

As a second embodiment, FIG. 6 shows a flowchart of the embodiment. Since a construction of the second embodiment is similar to that of FIG. 5, its description is omitted here. In the first embodiment, one LBP function is time-divided at predetermined time intervals and the print-out commands from a plurality of computers are received and the processes are executed. In the second embodiment, however, by switching the output requests from the computers every data amount of predetermined printer control commands sent from the computers, while a certain one computer is printing out a large amount of data, even when another computer generates the print-out request, such another computer can print out without waiting for the completion of the whole printing-out operation of the computer which is at present printing out. Further, by controlling the sorter attached to the paper discharging unit of the printer unit, each computer is allocated to each discharge tray, so that it is possible to know that the output original relates to the output result from which one of the computers.

(Embodiment 3)

Figure 7:
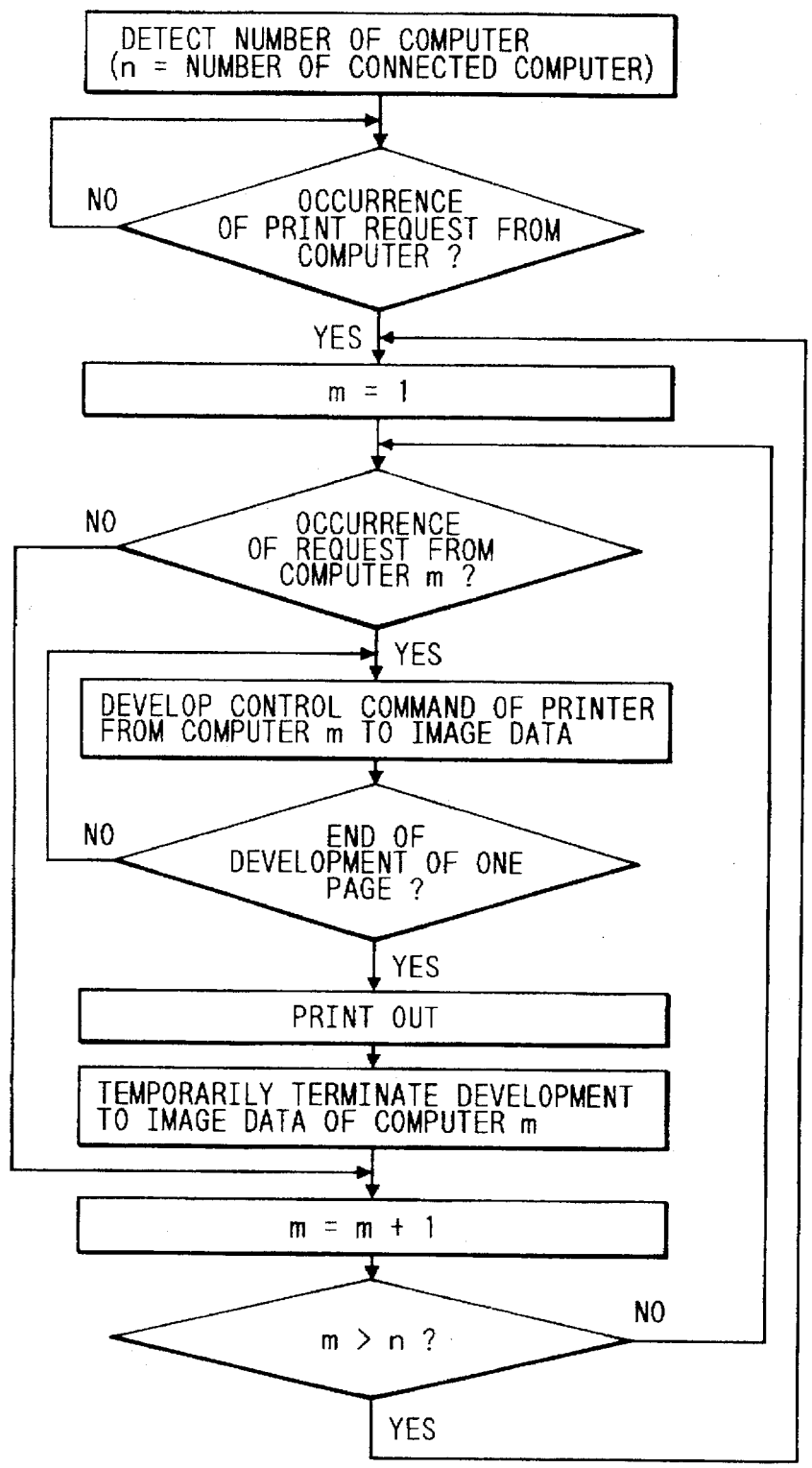
FIG. 7 is an operation flowchart of the third embodiment.

As a third embodiment, FIG. 7 shows a flowchart of the embodiment. FIG. 8 shows a block diagram. The same component elements as those in the first embodiment are designated by the same reference numerals and their descriptions are omitted here. In the first embodiment, one LBP function is time-divided at predetermined time intervals, the print-out commands from a plurality of computers 109 are received, the inside of the storage means 110 of a large capacity is divided, and the processes are executed. In the third embodiment, however, when the print requests are simultaneously generated from a plurality of computers 109, after completion of the development of one page in one computer, the use right of the LBP function of the printer controller unit 108 is transferred to another computer which generated the print request without executing the development of the next page, and such one computer is set into a temporary standby mode. After the computer to which the use right of the LBP function has been given finished the development of one page, the use right is also transferred to the next computer. In this manner, by transferring the use right of one LBP function, each time the development of one page was finished, it is sufficient that the storage means 110 has only the areas in which the data of one page can be developed. An effect similar to that in the first embodiment is obtained.

As described above, in the image forming apparatus to which a plurality of computers are connected, when the print requests are simultaneously generated from a plurality of computers, the operator who generated the print-out request later can print out without waiting for the completion of the printing-out operations of all of the computers which had generated the print-out requests before his request. In case of a conventional system in which a plurality of computers are connected to one image forming apparatus, while one computer is printing out a large amount of data, even when another computer generates the print-out request, such another computer can print out only after completion of the previous printing-out operation of all of a large amount of data. According to the invention, however, such a drawback is eliminated and by equivalently giving the use right of the image forming apparatus to all of the computers, the whole waiting time can be reduced.

What is claimed is:

1. An image processing apparatus that receives print data described in a page description language from a data output device, comprising:

memory means having a capacity to store a plurality of pages of dot data; and means for generating pages of dot data on the basis of respective portions of the received print data and for writing the pages of generated dot data into said memory means, wherein said generating means secures a plurality of areas in said memory means and executes a respective dot data generating operation on the respective portion of the print data to generate and store each respective page of dot data in a respective one of said areas, the dot data generating operations being performed in parallel by means of time-sharing conversion processes.

2. An apparatus according to claim 1, wherein said generating means sequentially generates the dot data in correspondence to each page every predetermined time while executing the dot data generating operations for a plurality of pages in parallel.

3. An apparatus according to claim 1, wherein said generating means generates the dot data in correspondence to each page every predetermined time while executing the dot data generating operations for a plurality of pages in parallel.

4. An apparatus according to claim 1, further comprising means for filing the dot data obtained by said generating means.

5. An apparatus according to claim 1, further comprising facsimile means for facsimile transmitting the dot data obtained by said generating means and for receiving facsimile data which is sent from an external facsimile apparatus.

6. An apparatus according to claim 1, further comprising reading means for reading an original and generating image data.

7. An apparatus according to claim 1, wherein said apparatus is connected to receive print data from a plurality of data output devices and wherein said generating means executes the respective dot data generating operations for each of a plurality of pages in parallel when print requests are concurrently received from a plurality of the data output devices.

8. An apparatus according to claim 7, further comprising a plurality of discharge trays, wherein said apparatus assigns one of said discharge trays to a respective one of the data output devices.

9. An apparatus according to claim 1, further comprising printing means for printing an image in accordance with each page of generated dot data.

10. An apparatus according to claim 9, wherein said printing means prints each image on a recording medium using an electrographic method.

11. An image processing apparatus comprising:

input means for inputting information representing images to be printed from at least a first source and a second source; and control means, responsive to the input of image information representing respective images from the first and second sources for printing, for controlling printing means so that the images represented by the image information received from the first source are interleaved with the images represented by the image information received from the second source, wherein the image information received from the first and second sources is described in a page description language and wherein said control means comprises converting means for converting the image information described in the page description language into image data.

12. An apparatus according to claim 11, further comprising the printer means.

13. An apparatus according to claim 12, wherein said printing means prints the images using an electrophotographic process.

14. An apparatus according to claim 11, wherein said converting means converts the image information received from the first source in an interleaved manner with the image information received from the second source to produce the image data for respective interleaved sheets printed by the printing means.

15. An apparatus according to claim 11, wherein one of the at least first and second sources is a reading means for reading a document and another of the at least first and second sources is a facsimile communication means.

16. An apparatus according to claim 11, further comprising sorting/stacking means for sorting or stacking sheets from the printing means.

* * * * *

UNITED STATES PATENT AND TRADEMARK OFFICE
CERTIFICATE OF CORRECTION

PATENT NO. : 5,737,092
DATED : April 7, 1998
INVENTOR(S) : TAKEHITO UTSUNOMIYA ET AL.

It is certified that error appears in the above-identified patent and that said Letters Patent is hereby corrected as shown below:

ON COVER PAGE AT [54] TITLE OF INVENTION

"DEVICE" should read --DEVICES--.

COLUMN 1

Line 3, "DEVICE" should read --DEVICES--.

Signed and Sealed this

Twenty-fourth Day of November, 1998

Attest:

BRUCE LEHMAN

Attesting Officer     Commissioner of Patents and Trademarks